Dec. 15, 1959  G. FRANCIS  2,917,190
CARPORT PARKING DEVICE
Filed May 19, 1958  5 Sheets-Sheet 1

Fig. 1.

INVENTOR.
GEOFFREY FRANCIS.
BY
[signature]
ATTORNEY

Dec. 15, 1959   G. FRANCIS   2,917,190
CARPORT PARKING DEVICE
Filed May 19, 1958   5 Sheets-Sheet 2

INVENTOR.
GEOFFREY FRANCIS
BY
M. H. Atkinson
ATTORNEY

Dec. 15, 1959 G. FRANCIS 2,917,190
CARPORT PARKING DEVICE
Filed May 19, 1958 5 Sheets-Sheet 3

Fig. 4.

INVENTOR.
GEOFFREY FRANCIS.
BY
Wm H. Atkinson
ATTORNEY

Dec. 15, 1959    G. FRANCIS    2,917,190
CARPORT PARKING DEVICE
Filed May 19, 1958    5 Sheets-Sheet 5

Fig. 9.

INVENTOR.
GEOFFREY FRANCIS.
BY
*[signature]*
ATTORNEY

United States Patent Office 2,917,190
Patented Dec. 15, 1959

2,917,190

CARPORT PARKING DEVICE

Geoffrey Francis, San Francisco, Calif.

Application May 19, 1958, Serial No. 736,250

17 Claims. (Cl. 214—16.1)

My present invention relates to an automobile parking and/or like storage means and more particularly to a mechanical device for increasing the storage capacity of a small ground area where property values, space and other considerations make a conventional garage or storage building impractical.

The main object of the invention is to provide a novel parking device by which a plurality of automobiles or other suitable objects may be parked or stored upon a limited ground area in an effective, economical and practical manner.

A further object of the invention is to provide an automobile parking and storing device employing a number of movable lifts or platforms by which the automobiles are stored or parked upon individual platforms that move in vertical paths defined by a supporting structure.

Another object of my invention is to provide a mechanical automobile parking device that may be set up in a parking lot and employed to park a greater number of automobiles than would be possible within the ground area occupied by the parking device and featured by the fact that the automobiles are parked upon individual platforms in such a manner that they may be driven directly upon or from such platforms without complicated maneuvering.

Another object of the invention is to provide a novel type of drive for an automobile parking device of the character described in which the vertical and transitional movements of the automobile supporting lifts or flights are synchronized and driven by a single source of power.

A further object of the invention is to provide an automobile parking and/or storage facility in which the automobiles and other commodities may be parked or stored upon individual platforms or lifts that move vertically up or down at one side of a supporting structure while similar platforms or lifts are respectively moving down or up at the other side of the supporting structure.

Another object of the invention is to provide a tier type automobile parking facility having vertically extending pallet or platform guiding trackways and novel transition arrangement at its top and bottom for transferring automobile supporting pallets or platforms from one vertical trackway to the other and in synchronized relation with the vertical movement of said pallets and/or platforms.

Another object of the invention is to provide a novel form of automobile parking device in which a plurality of automobile supporting platforms or pallets are independently connected to and disconnected from a single continuous driving chain for movement in vertical pathways and transferred from one to the other of said pathways at the base and upper limits thereof in a practical manner.

Other objects and advantages will be in part evident to those skilled in the art and in part pointed out hereinafter in connection with the accompanying drawings wherein there is shown by way of illustration and not of limitation a preferred embodiment of the invention.

In the drawing wherein like numerals refer to like parts throughout the several views.

A feature of my present invention is that it will provide a maximum of storage space with a minimum structural and ground area requirement. Unlike many prior mechanical automobile parking devices, the invention contemplates a device having two vertical trackways or lift channels for disconnected vertically movable platforms upon which an automobile may be driven for storage or over which the automobile may pass to a similar parking device arranged at the rear and/or in alignment with other similar devices at a particular location. In this manner the number of automobiles that can be accepted or delivered at one time may be determined by the number of these devices employed at any particular location. In addition to a supporting structure having a minimum number of parts, my device is adapted for operation from a single source of power and with a simple chain arrangement having spaced platform supporting means by which the platforms with automobiles thereupon are engaged and moved upwardly along a vertical trackway on one side of the structure and downwardly along a similar trackway at the other side of the structure. The invention also includes a novel platform transfer means by which the platforms with or without an automobile thereupon are moved laterally for transfer from one to the other of the vertical trackways at a rate of speed that will permit a close spacing of the platforms in their vertical movement along the vertical trackways and thus a pause or change in the rate of speed in the platform driving chain is avoided.

A further feature of the invention resides in the fact that the platform driving chain in its path of vertical travel is guided and operates over sheaves or cams that introduce a substantially horizontal path of movement for the platform supporting means carried by the lift chains at the upper and lower limits in their vertical direction of travel. This avoids shock or snatch as the platforms are engaged for lift and/or become disengaged with the lift driving chain at the upper and lower limits in their paths of vertical movement.

In addition to the employment of the platform elevating and controlling chain with its spaced platform supporting means, my invention also contemplates the use of a novel driving connection between the platform elevating or drive chain and a separate lateral shift or transfer controlling chain that will operate to impart a reciprocating movement to the latter chain with a synchronized period of dwell at each reversal in its direction of travel. This will result in a smooth and shockless transfer of the automobile supporting platform from the platform supporting means carried by the drive chain to the platform moving or transfer means which is driven by said second chain for lateral movement from one to the other of the vertical trackways between the spaced columns at the sides of the structure.

For a general description of the invention, reference is now made to Figure 1 of the drawings, which shows an assembled view of the device that may be taken as a front or rear view as the device employs two complete assemblies, as here shown, placed one behind the other and held in spaced relation by a connecting structure to be later described. As here illustrated, the parking device is shown with one of the automobile supporting platforms stopped and centered at ground level midway between descending and ascending trackways at the sides of the device. In this position of the platform an automobile to be delivered may be boarded and driven away, whereupon a new customer may be directed to drive his vehicle onto the waiting empty platform without again operating the parking machine. When the customer has locked and quitted his vehicle, the attendant can actuate the power control and the platform with the newly parked automobile will be shifted laterally by a transversing dolly mechanism to the extremity of its movement and into alignment with a vertical trackway where it becomes free of the traversing dolly mechanism to commence its vertical travel under the power of a lift chain.

Figure 1:
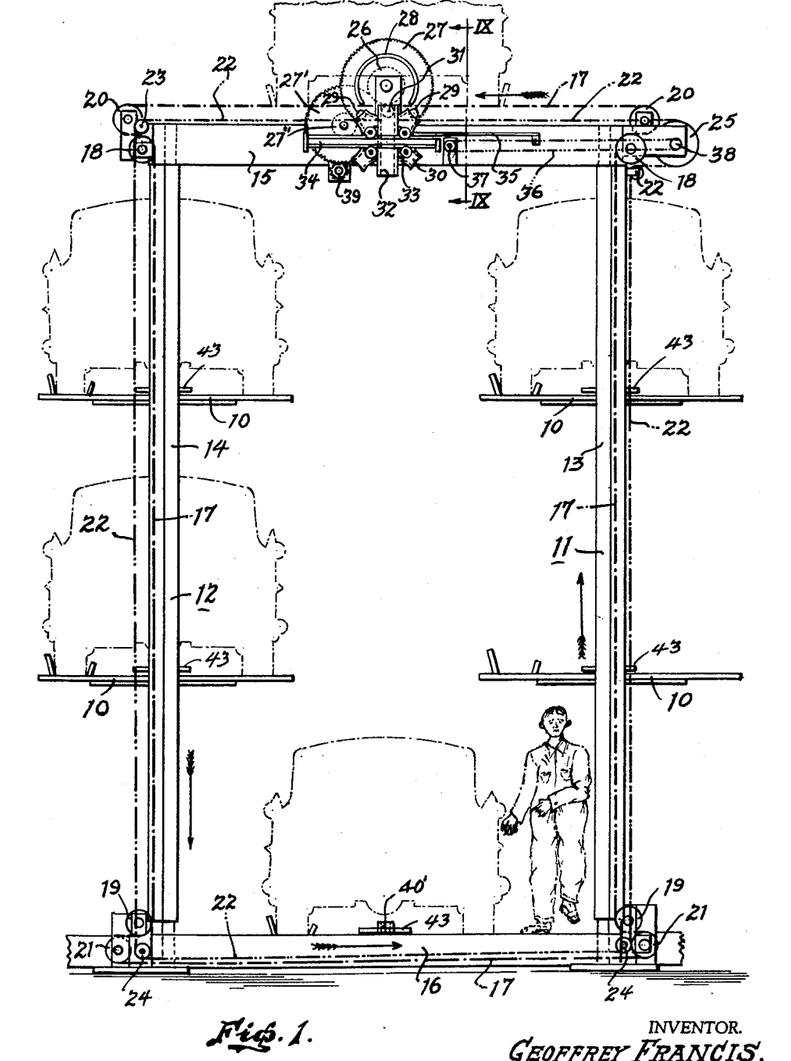
Figure 1 is a front view in elevation showing a preferred embodiment of my invention for the parking and storage of automobiles.

In Figure 1 of the drawings, I have for the purpose of this description shown my device in general outline with six automobile supporting platforms 10, but it will be understood that a larger number of platforms may be provided where desired by merely increasing the dimensions of the vertical trackways of the device. The platforms 10 move in a continuous path which includes, as here viewed, an ascending lift trackway 11 at the right and a descending trackway 12 at the left. The ascending trackway 11 is formed between two longitudinally spaced columns or rail forming members 13 and the descending trackway 12 is formed between two longitudinally spaced columns or rail forming members 14. With respect to this showing, it is to be understood that the structure as here illustrated will be duplicated at the far ends of the platforms. In parking the lowermost platform 10 with an automobile thereupon, as indicated by dot and dash lines, will be moved laterally into a position between the spaced columns 13 and move vertically in an ascending manner along the trackway 11 and later after its ascent, the platform 10 will be positioned between the spaced columns 14 for its descending travel. The upper end of the columns 13 and 14 are held in properly spaced lateral relation by a horizontally extending strut 15 and at their lower ends these columns 13 and 14 are fixed in both lateral and longitudinally spaced relation by a spindle foundation structure 16, which can rest upon the surface of a parking lot or the floor of a building. Extending longitudinally between the struts 15 at the upper ends of the columns 13 and 14 and midway between their ends, there are reinforcing beams, not here shown, which serve to retain the laterally disposed struts 15 and the columns 13 and 14 in fixed longitudinally spaced relation. In this figure of the drawings, there is diagrammatically indicated by dot and dash lines, the path taken by a single continuous length of lift driving chain 17 which passes over two sprockets 18 at the upper ends of the columns 13 and 14 and around two correspondingly located sprockets 19 at the lower ends of these columns. Disposed laterally outward and above the sprockets 18, there are two additional sprockets or sheaves 20 and located in a similar manner at the lower end of the columns 13 and 14, there are additional sprockets or sheaves 21 around which the lift operating chain 17 moves. With this arrangement of spockets or sheaves 20 and 21, the chain 17 is directed in a substantially horizontal path for a short distance in its vertical path and at the point where means, to be described, carried by the platforms 10 may engage and/or disengage the lift or platform supporting means carried by the chain 17 as the platforms are moved into and out of alignment with the columns 13 and 14 and the lift chain 17.

As will also hereinafter appear, the strut 15 at the upper ends of the columns 13 and 14 and the foundation structure 16 at the base of these columns provide a support for traversing dollys which operate at these points to stabilize and transfer the platforms 10, either with or without an automobile, from one to the other of the trackways formed between the spaced columns 13 and 14. These traversing dollys and their associated details are to be described in more detail hereinafter. However, it may be here stated that like the lift platforms, these traversing dollys are operated simultaneously with a reciprocating motion at the top and bottom of the device by a single length of operating chain, here diagrammatically illustrated by double dot and dash lines and designated by the numeral 22. The chain 22 also follows a substantially rectangular path about sheaves or sprockets 23 at the top of the columns 13 and 14 and similar sheaves or sprockets 24 at the bottom of the columns 13 and 14. On this point, it will be noted, at the upper right hand corner of this view, that the chain 22 is passed around a relatively larger sprocket 25 that serves to drive the dolly operating chain 22 with its periodically reversed direction of travel. To impart this reciprocating or reversed direction of travel to the dolly operating chain 22, I show a type of mechanism that might be employed for this purpose. This intermittent drive may take any form, here indicated as consisting of a gear 26 that engages and is driven by the lift operating chain 17. This gear 26 is keyed to and drives a star wheel operating gear 27 having a dwell ring 28 and two star wheel engaging pins 29 that turn a star wheel 30 one-quarter revolution upon each full revolution thereof. The star wheel 30 has a crank pin 31 that operates in a vertical channel 32 carried by a laterally moving carriage 33 that travels along a fixed horizontal rail 34 supported by the strut 15 between the vertical trackways 11 and 12. Attached to the laterally moving carriage 33, there is an arm 35 that is connected to and drives a looped reciprocating chain 36, diagrammatically indicated by a triple dot and dash line. This chain 36 passes over two spaced spockets 37 and 38. The sprocket 37 idles while the sprocket 38 is keyed to drive the larger sprocket 25 that operates as a drive for the traversing dolly operating chain 22. Because of the ratio of the diameters in the sprockets 25 and 38, the traversing dollys will move the platforms 10 when engaged thereby from one to the other of the vertical trackways 11 and 12 at a higher rate of speed than the speed of the platforms 10 in their vertical travel. This will permit a closer spacing of the platforms 10 than would be possible if the transfer of the platforms 10 from one to the other of the trackways were dependent upon a drive directly from the platform driving chain 17. Associated with the dolly operating chains at the front and rear of the device, I show a longitudinal shaft 39 having pinions 39' at its ends that are connected to the star wheel operating plate 27 by a gear train, i.e. the gears 27' and pinion 27 that are in turn driven by the lift chains 17 through the gear 26 which is keyed to a shaft upon which the gear 27 is mounted.

Figure 2:
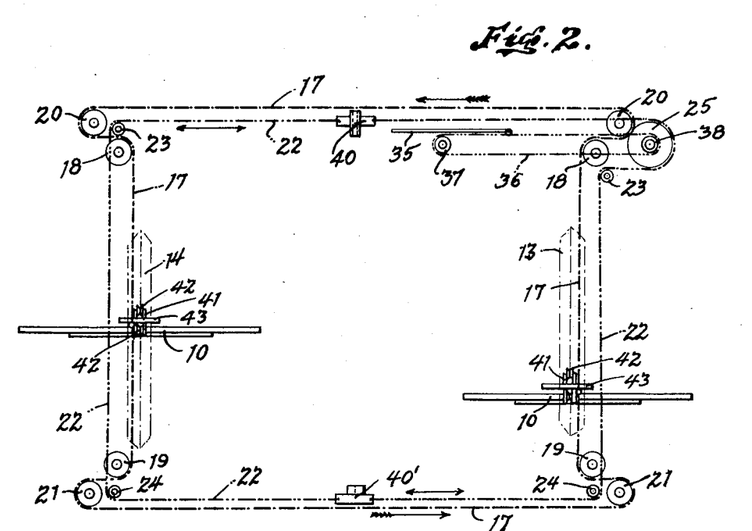
Figure 2 is a diagrammatic illustration showing the operating chains as employed in accordance with the invention.

Reference is now made to Figure 2 of the drawings for a further explanation as to the relationship and operating characteristics of the three different chain driving arrangements as outlined above. In this showing the vertical dimension of the arrangement has been foreshortened because of space requirements and in addition to a stabilizing transfer dolly 40 which shuttles between the upper ends of the trackway forming columns 13 and 14, the location of which is here indicated by dot and dash lines, there is a second traversing and stabilizing dolly 40' at the lower ends of the columns 13 and 14. This dolly 40' like the dolly 40 is shown as connected to and driven with a reciprocating motion between the columns 13 and 14 by the dolly controlling chain 22. In this arrangement, it will be understood, as here viewed, that when the dolly 40 at the upper end of the columns 13 and 14 is moved to the right the dolly 40' at the base of the columns 13 and 14 will move to the left. This will place the dolly 40 in a position to take over control of one of the platforms 10 as it reaches the upper end of the column 13 and at the same time the dolly 40' will be located in a position where it will take over the control of another of the platforms 10 as this platform reaches the lower end of the column 14.

In this figure of the drawing, it will be noted that the vertical columns 13 and 14, as shown by dot and dash lines and which respectively form the trackways 11 and 12, are disposed slightly inward laterally from the vertical ascending and descending paths of the platform driving chain 17. At each end of the platforms 10 there is a bogey 41 having a pair of vertically spaced rollers or wheels 42 that engage with the rail forming portions of the columns 13 and 14 and which serve to retain the platforms upon the trackways formed therebetween. As a means for connecting the platforms 10 to the drive chain 17 in both the ascending and descending paths, the bogeys 41 each also carry oppositely extending spaced fingers 43 between which the chain 17 is positioned when the platforms 10 are moved laterally into a position for ascending or descending travel along one or the other of the trackways 11 or 12 as formed between the spaced columns 13 and 14.

In this showing, the dollys 40 and 40' are stopped at the mid-point of their lateral travel so that an automobile may be driven directly upon the lowermost platform 10 in parking or therefrom in deparking as the case may be. If space permits, it is intended that when one of the platforms 10 is stopped in this mid-position as indicated in Figure 1, the automobile may be driven forward therefrom in a direction away from the observer and then another automobile to be parked may be driven forward directly thereupon. Otherwise, it will be understood that the automobile placed thereupon may be backed-off or onto the platform 10 as desired. Then as the positioning of the automobile upon the platform in this manner has been completed, the operator by operating a suitable control switch, the device will be set in operation and the parked automobile will then be moved to the right under the influence of the dolly 40' to a point where the drive chain 17 will take over and cause the platform 10 to be moved upwardly along the trackway 11 to a point where the dolly 40 will take over and shift this particular platform to the upper end of the trackway 12 where the drive chain 17 will again take over and lower the platform along the trackway 12 where the platform will again be engaged by the dolly 40' for a repetition of the operating cycle described. If it should happen that a desired automobile is in one of the vertical trackways nearer to the point of discharge or delivery to the customer, the arrangement will be such that the drive may be reversed so as to deliver the particular automobile without carrying all of the platforms with parked automobiles thereupon through more than one-half cycle of operation. A feature of this arrangement is that a minimum of street or site frontage will be required as the parking and deparking of the automobiles can be carried out with a single runway.

Figure 3:
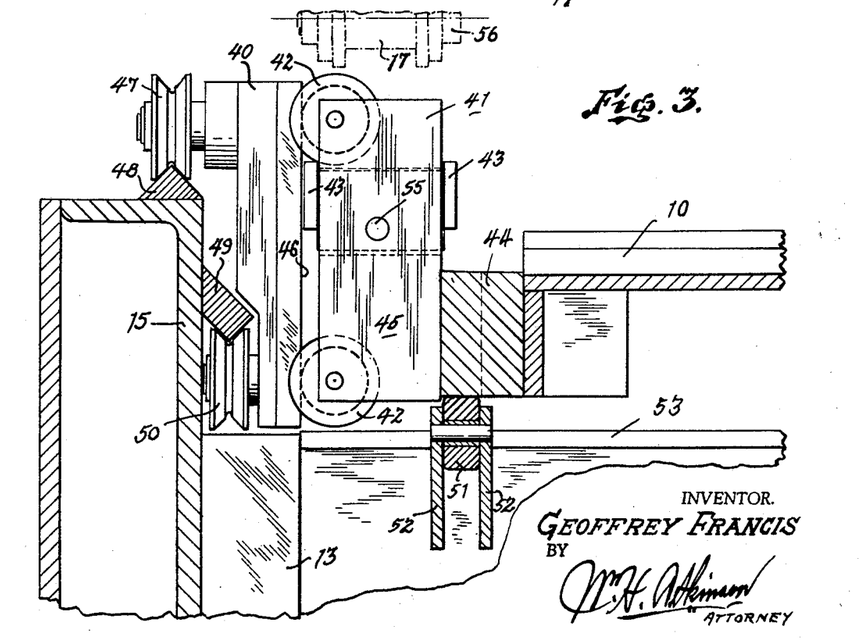
Figure 3 is a fragmentary side view showing a platform supporting and traversing arrangement as employed by my invention.
Figure 4:
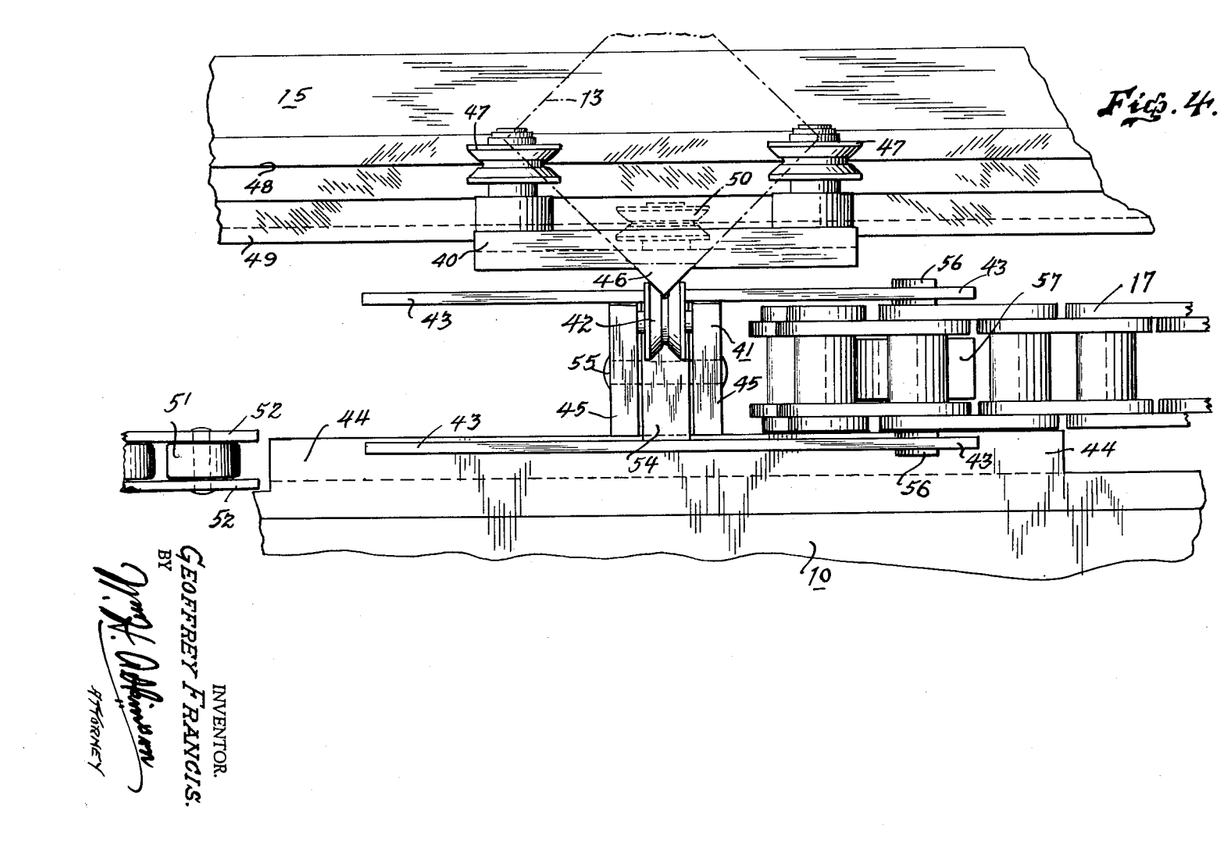
Figure 4 is a fragmentary plan view of the arrangement shown in Figure 3.

Reference is now made to Figures 3 and 4 of the drawings for a more detailed description of the platforms 10 and the manner in which they are associated with the vertical trackway forming columns 13 and 14. As shown the platforms 10 have a laterally extending flange or extension 44 along their opposite ends from the center of which two spaced vertical plates 45 extend to form the chassis of the bogey 41 which supports the two vertically spaced trackway engaging wheels or rollers 42.

As shown in Figure 3 the bogey 41 with a platform 10 has been elevated by the chain 17 to a point where the wheels or rollers 42 have moved upwardly beyond the upper limits of the trackway forming columns 13 and in full engagement with a V-shaped ridge 46 that is carried by the adjacent face of the stabilizing dolly 40. The dolly 40 has two laterally spaced rollers or wheels 47 that ride upon a laterally extending triangular ridge or rail 48 carried by the strut 15 which extends between the upper ends of the columns 13 and 14. For retaining the dolly 40 upon the strut 15 there is also shown an inverted triangular rail forming member 49 that is engaged at its underside by a third wheel or roller 50 carried by the dolly 40. When the bogey 41 and the platform 10 have arrived at the elevated position here indicated, the platform will be free at each end from the vertical columns 13 between which the trackway 11 is formed and in a position where the platform under the control of the stabilizing dolly 40 may be moved laterally or toward the viewer. At this point, and substantially simultaneously in point of time with the disengagement of the fingers 43 with the operating chain 17, the under side of the extending flange 44 carried by the platforms 10 will engage a series of rollers 51 that are mounted in spaced relation between laterally extending plates 52 that are supported in a horizontal plane by the reinforcing beams 53 that extend longitudinally between the struts 15 at the upper ends of the laterally spaced columns 13 and 14. In addition to the column and traversing dolly engaging wheels or rollers 42, the spaced plates 45 of the bogey 41 also provide a support for a block 54 to the ends of which the spaced fingers 43 are firmly secured. The finger supporting block 54 is here shown as mounted for limited pivotal movement in a vertical plane about a laterally extending pin 55. The purpose of this mounting for the spaced chain engaging fingers 43 is to provide for an equalizing of the load upon the platform between the fingers 43 when in engagement with the lift controlling or load supporting means of the chain 17. This lift controlling or load supporting means carried by the chain 17 is more clearly illustrated in Figure 4 of the drawings, as two oppositely extending projections or pins 56 at spaced points throughout the length of the chain with which the spaced fingers 43 carried by the bogey 41 engage. The clearance and location of the drive chain 17 above the platform strut 15 in its movement from the trackway 11 to the trackway 12 is indicated in Figure 3 of the drawings by dot and dash lines.

Now with particular reference to Figure 4 of the drawings, it will be noted that when the dolly 40 is in a position directly over and in alignment with the trackway formed by the spaced columns 13, here shown by dot and dash lines, the fingers 43 of the bogey 41 of the platform 10 will be carried up to a point where, as will be presently described, the platform supporting pins 56 carried by the driving or lift chain 17 will be substantially static insofar as vertical movement is concerned as the chain 17 will be moving along a substantially horizontal path. At this point, the lateral movement of the dolly 40 to the left will be initiated and at the same time or slightly in advance of disengagement between the spaced fingers 43 and the load supporting pins 56 carried by the chain 17 the underside of the flange or extension 44 carried by the platform 10 will engage with the spaced supporting rollers 51 between the plates 52 that are carried by the stabilizing beams 53. This lateral movement of the platform 10 will then continue to a position immediately over and in alignment with the descending trackway 12 formed by the spaced columns 14. At the same time it will be evident from the above that the oppositely extending ends of the spaced fingers 43 carried by the bogey 41 will come into engagement with another set of descending load supporting pins 56 carried by the chain 17 and the platform 10 in question will be carried downwardly thereby along the trackway 12 and free of the dolly 40.

Figures 5, 6, 7, 8:
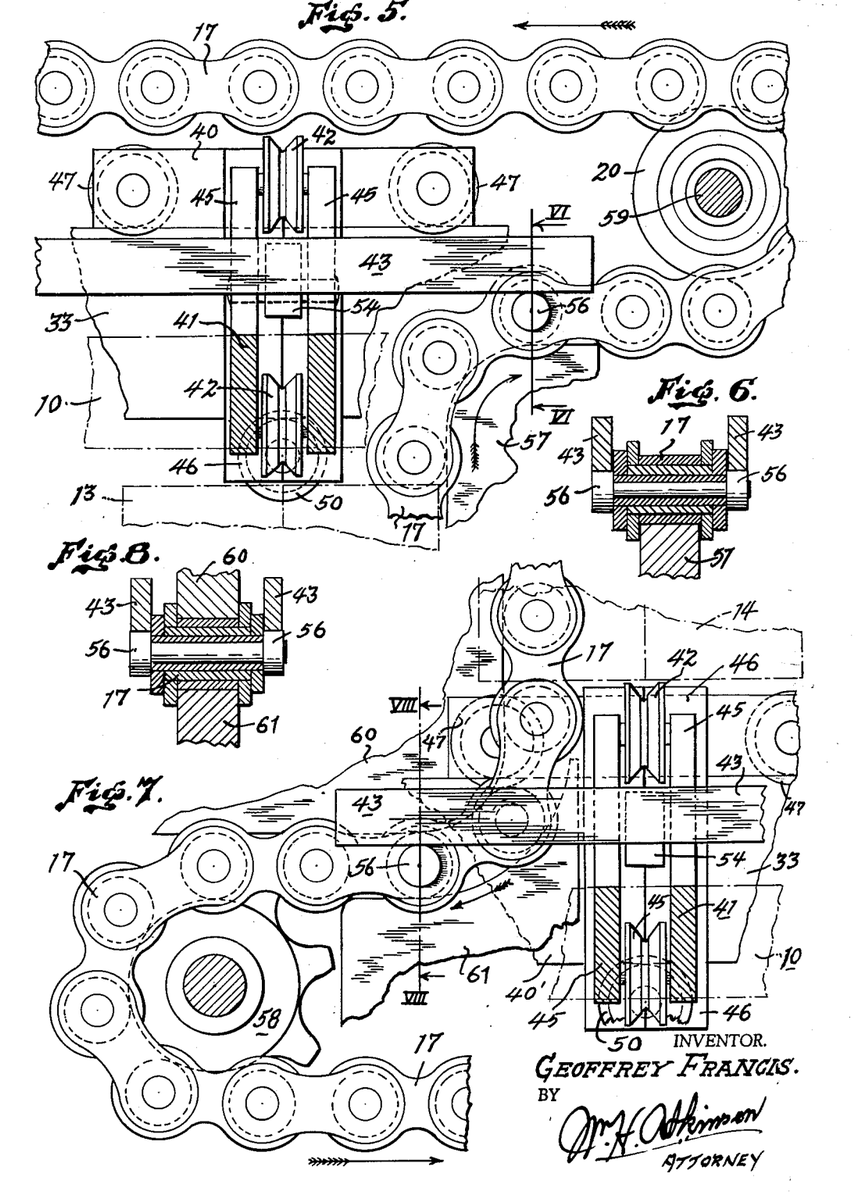
Figure 5 is a fragmentary view showing the path of the platform lift chain at the upper corners in its path of travel.
Figure 6 is a sectional view taken along line VI—VI of Figure 5 looking in direction of arrows.
Figure 7 is a fragmentary view showing the path of the platform lift chain at the lower corners in its path of travel.
Figure 8 is a fragmentary view taken along line VIII—VIII of Figure 7 looking in direction of arrows.

Figure 5 of the drawings is a fragmentary view showing in more detail the disposition of and the manner in which the spaced extending fingers 43 carried by the bogey 41 cooperates with the lift driving chain 17. This view is taken from the upper right hand corner of the assembly as illustrated in Figures 1 and 2 and at the point where the platform 10 is about to be shifted to the lift from its support upon the chain 17 and over the horizontally disposed supporting rollers 51 under the control of the transfer dolly 40. Instead of the circular sprockets 18, as shown in the preceding figures of the drawings, this view shows a stationary cam 57 instead of the pulley 18, over which the drive chain 17 travels in the direction indicated by arrows. As will be noted from Figure 6 of the drawings, the chain 17 is of the roller type and is, therefore, adapted to a mounting in this manner. This latter view also clearly points up the fact that the extending pins 56 carried by the drive chain 17 may be in the form of rollers upon which the extending fingers 43 of the bogey 41 ride as the platforms 10 are lifted to the point here illustrated by the chain 17. The outline of the platform 10 is here indicated by dot and dash lines, as is also the upper end of the columns 13 with which the V-shaped ridge 46 upon the stabilizing transfer dolly 40 is in register.

Figure 7 is a similar fragmentary view taken from the lower left hand corner of the device as illustrated in Figures 1 and 2 and illustrates the manner in which the platforms are supported and become disconnected from the drive chain 17 at the lower end of the left or trackway 12 provided by the spaced columns 14. In this view, a sprocket 58, instead of a sheave or pulley 21 is shown to which power may be applied to drive the lift chain 17. In this connection, however, it will be understood that the drive of the chain 17 may well be connected at other points in the assembly, as for example, to a shaft 59 by the substitution of a similar sprocket instead of the sheave or pulley 20 as illustrated in Fig. 5. The bogey 41 is here shown as in a position where the platform 10 will move to the right and engage with a horizontally disposed rollerway as formed by the rollers 51 and described in connection with Figures 3 and 4. As the platform 10 moves to the right from the position here shown the extending fingers 43 of the bogey 41 will be carried out of engagement with the extending pins 56 of the chain 17 upon which the platform 10 has been supported in its descent along the trackway 12 formed between the columns 14, one of which is here illustrated by dot and dash lines as in register with the V-shaped ridge 46 of the dolly 40'. The cross-sectioned part as shown at the lower ends of the spaced plates 45 as shown in Figures 5 and 7 of the drawings, is in a plane substantially at the point where these plates extend from the platforms 10 which is here indicated by dot and dash lines. In this figure of the drawings, I have shown a stationary cam plate 60 which has been substituted for the pulleys 19 at the lower ends of the columns 13 and 14 and to avoid any possibility of the chain 17 looping and becoming free of and out of contact with the cam plate 60 in its horizontal path of travel, I have also provided an oppositely arranged stationary cam plate 61 which together with the cam plate 60 will provide what might be termed a throat through which the chain 17 moves in that portion of its horizontal travel where the extending pins carried thereby are engaged by the spaced fingers 43 carried by the bogeys 41. These cam plates 60 and 61 as illustrated in Figure 8 of the drawings, are of a thickness substantially equal to the roller portion of the chain 17 and because of the flanges provided by the larger diameter of the chain links, it will be seen that the chain will be retained in its normal plane of operation.

Figure 9:
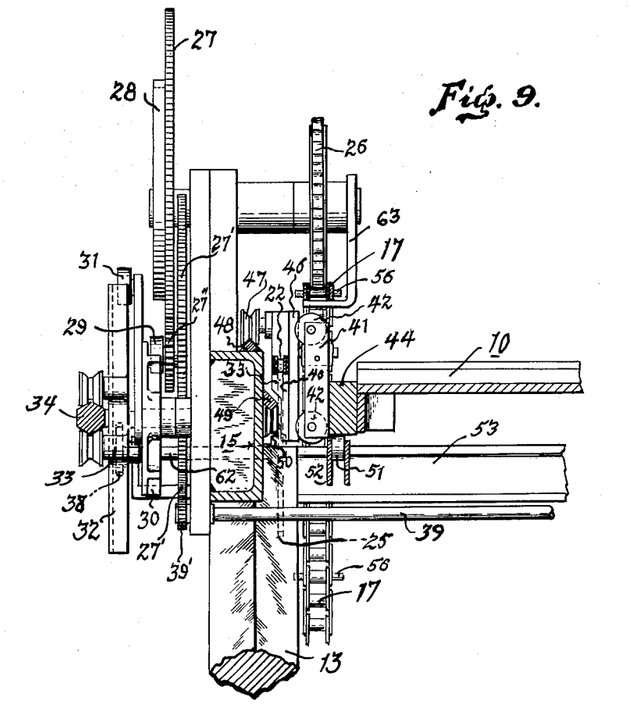
Figure 9 is a fragmentary side elevation of the intermittent drive producing mechanism between the platform lift chain and a traversing dolly chain.

By way of further explanation, reference is now made to Figure 9 of the drawings for a more detailed description of the intermittent drive producing connection employed for imparting reciprocating movements to the dolly traversing chain 22 from the platform operating chain 17. As here indicated, it will be noted that the platform 10 with its extending flange 44 and the trackway engaging bogey 41 are supported for lateral movement upon the rollers 51 that are carried by the spaced supporting plates 52 and form a horizontal extending support over which the platforms 10 are moved laterally from one vertical trackway to the other. During this transitional movement, the rollers or wheels 42 of the bogey 41 will be in full engagement with the V-shaped ridge 46 carried by the dolly 40. Then as the dolly 40 is moved laterally by its driving chain 22, the platform 10 will be caused to move laterally. The dolly 40, as previously described, is in turn here shown as supported upon the strut 15 by the triangular ridge or rail 48 and the inverted triangular rail forming number 49. Another feature more clearly shown in this figure of the drawings is the provision of an underslung bracket or guide 63 over which the lift chain 17 is guided and held in driving engagement with the sprocket 26. In this arrangement, as the sprocket 26 is driven in this manner by the chain 17, the gear 27 with its dwell ring 28 and the star wheel operating pins 29 will be rotated and as the pins 29 of the gear 27 engage the star wheel 30, the latter will be moved through one quarter of a revolution. As the star wheel 30 is thus turned the crank pin 31 carried thereby and operating in the vertical channel 32 of the carriage 33, will cause the carriage 33 to move laterally along the fixed horizontal rail 34 upon which it is supported and as previously indicated this lateral movement of the carriage 33 operating through the connecting arm 35 will drive the looped reciprocating chain 36 which passes over the sprocket 38 here shown as dotted. At this point, it will be noted that the sprocket 38 is fixed to the end of a shaft 62 upon which the larger sprocket 25 is also mounted. As the sprockets 38 and 25 are operated in response to the lateral movements of the carriage 33, it will be seen that a corresponding reciprocating motion will be imparted to the dolly operating chain 22 and as hereinbefore indicated, because of the difference in diameters of the sprockets 25 and 38 the dolly operating chain 22 will be caused to move at a rate of speed that will move the platform 10 from one vertical trackway to the other in such a manner that there will be no interference between successive platforms as they approach the upper and lower limits of their respective paths of travel.

While I have, for the sake of clearness and in order to disclose my invention so that the same can be readily understood, described and illustrated a specific form and arrangement, I desire to have it understood that this invention is not limited to the specific form disclosed, but may be embodied in other ways that will suggest themselves to persons skilled in the art. It is believed that this invention is new and all such changes as come within the scope of the appended claims are to be considered as part of this invention.

Having thus described my invention, what I claim and desire to secure by Letters Patent is:

1. In a passenger automobile parking device, the combination of a foundation of rectangular outline having a vertically extending trackway forming column at each corner thereof, a plurality of automobile supporting platforms having trackway engaging means at the ends thereof for retaining same in vertical paths of travel between the spaced columns at each side of said foundation, a horizontally extending platform supporting means between the columns at each end of said foundation, a platform controlling dolly movable laterally in shuttle fashion upon said supporting means and between the trackway forming columns at the sides of said foundations, a continuous reciprocating drive chain operating at the upper and lower ends of said columns for imparting the lateral shuttling movements to said platform controlling dolly, means upon said platform controlling dolly engageable with the trackway engaging means at the ends of said platforms for moving said platforms laterally from one to the other of the pairs of spaced columns between which said platforms move vertically, and a continuous lift of chain with up and downwardly moving portions operating in a vertical plane at each end of said foundation having spaced dolly engaging and supporting means by which said platforms will be carried upwardly and/or downwardly along the trackways formed at the sides of said foundation by said columns in timed relation with the lateral shuttle-like movements of said platform controlling dolly.

2. In a passenger automobile parking device, the combination of a ground level foundation, a pair of vertical trackway forming columns extending upwardly in spaced relation at one side of said foundation, a second pair of spaced columns at the other side of said foundation, a horizontally extending reinforcing strut between the upper ends of the columns at each end of said foundation, a platform moving dolly operating laterally upon said strut in shuttle fashion between the upper ends of the trackway forming columns at each end of said foundation, a plurality of automobile supporting platforms having trackway engaging means at the ends thereof for retaining same in vertical paths of travel between each of said pairs of spaced columns at the sides of said foundation, a reciprocating drive chain for controlling the movements of said platform moving dolly, means carried by said platform moving dolly engaged by the trackway engaging means at the ends of said platforms, and a continuous length of chain operating in a vertical plane at each end of said foundation having dolly engaging platform supporting means by which said platforms will be carried upwardly and/or downwardly in equally spaced relation between said trackway forming columns and in timed relation with the lateral movements of said platform moving dolly for transfer from one to the other of said trackways.

3. In a space saving automobile parking device of the character described, the combination of a substantially rectangular foundation forming base having a vertically extending column at each corner thereof forming a trackway at each side of said base, a plurality of automobile supporting platforms having trackway engaging means at the ends thereof for guiding same in vertical paths of travel between the columns at the side of said base, a horizontal platform supporting means extending between the upper ends of the columns at each end of said base, a platform controlling dolly movable along said supporting means in shuttle fashion between said trackway forming columns, a reciprocating drive chain for imparting a shuttling movement to said platform controlling dolly, means upon said platform controlling dolly engaged by the trackway engaging means at the ends of said platforms for moving said platforms from one to the other of said pairs of spaced trackway forming columns, a continuous length of chain at each end of said base operating adjacent the vertical columns for imparting up and down directions of travel to the platforms at each side of said foundation, and platform supporting means carried by said length of chain for moving said platforms upwardly and/or downwardly in equally spaced relation along the trackways formed by said columns in timed relation with the lateral movements of said platform controlling dolly at the ends of the trackways formed by the columns at the sides of said foundation forming base.

4. In a passenger automobile parking device, the combination of a rectangular base, a vertically extending trackway forming column at each corner of said base, a laterally extending strut between the tops of the vertical columns at the ends of said rectangular base, a platform moving dolly operating shuttle fashion upon said strut between the upper ends of the trackway forming columns at each end of said rectangular base, a platform supporting means extending between the ends of the trackways formed by said columns, a reciprocating drive chain for controlling the movements of said platform moving dolly, a plurality of automobile supporting platforms having trackway engaging means at the ends thereof for retaining same in vertical paths of travel between the spaced columns at the sides of said base, means carried by said platform moving dolly engaged by the trackway engaging means at the ends of said platforms for moving said platforms laterally over said platform supporting means from one to the other of the pairs of spaced columns, a continuous length of chain at each end of said base associated with the trackway forming columns and having spaced platform supporting means by which said platforms will be carried upwardly and/or downwardly in equally spaced relation along the trackways formed by said columns and in timed relation with the lateral movements of said platform moving dolly, and longitudinally extending beams connecting said laterally extending struts for spacing and stabilizing said laterally extending struts and the platform supporting means at the upper ends of said trackway forming columns.

5. In an automobile parking device of the character described, the combination of a ground level foundation of rectangular outline having two spaced columns along each side thereof and forming therebetween two vertically extending trackways, a plurality of automobile supporting platforms having means for engaging and retaining same for vertical movement upon the trackways formed between said spaced columns, a horizontal strut extending laterally between the upper ends of each of the trackway forming columns at each side of said foundation, a platform moving dolly operating shuttle fashion upon said strut between the upper ends of the trackways at the sides of said foundation at one end of said platform, a second dolly operating in a similar fashion between the trackways at the side of said foundation and at the opposite end of said platforms, a single and continuous reciprocating drive chain operating at each end of said foundation between said trackways at the upper and lower ends of said columns for imparting the lateral shuttling movements to said platform moving dolly, means upon said platform moving dollys engageable with the means at the ends of said platforms for moving said platforms laterally from one to the other of the pairs of spaced trackway forming columns, and a continuous length of chain operating in a vertical plane at each end of said foundation having spaced platform supporting means by which said platforms will be carried upwardly and/or downwardly along the trackways at the sides of said foundation as formed by said columns and in timed relation with the lateral shuttle-like movements of said platform moving dolly.

6. In an automobile parking device of the character described, the combination of a ground level foundation of rectangular outline having two spaced columns along each side thereof and forming therebetween two vertically extending trackways, a plurality of automobile supporting platforms having means at their ends for engaging and retaining same for vertical movement upon the trackways formed between said spaced columns, a horizontal strut extending laterally at each end of said foundation between the upper ends of each of the trackway forming columns, a platform moving dolly operating shuttle fashion upon said strut between the trackways at the sides of said foundation, a single reciprocating drive chain operating between said trackways at the upper and lower ends of said columns for imparting the lateral shuttling movements to said platform moving dolly, means upon said platform moving dolly engageable with the platform retaining means at the ends of said platforms for moving said platforms laterally from one to the other of the pairs of spaced trackway forming columns, a continuous length of chain operating in a vertical plane at each end of said foundation having spaced platform supporting means by which said platforms will be carried upwardly and/or downwardly along the trackways formed by said columns, and means driven by said continuous length of drive chain for driving said reciprocating drive chain at a higher rate of speed with the movements of said platform moving dolly in timed relation with the upward and downward movements of said platforms along said trackways.

7. In an automobile parking device of the character described, the combination of a ground level foundation of rectangular outline having two spaced columns forming therebetween a vertically extending trackway along each side thereof, a plurality of automobile supporting platforms having means at their ends for engaging and retaining same for vertical movement upwardly at one side of said foundation upon the trackways formed between said spaced columns and downwardly at the other side thereof, a horizontal strut extending laterally between the upper ends of the trackway forming columns at the sides of said foundation, a platform controlling dolly operating shuttle fashion upon said strut at one end of said foundation for moving said platforms from one to the other of said trackways, a second dolly operating shuttle fashion between the trackway forming columns at the other end of said foundation, a reciprocating drive chain operating between the upper and lower ends of said columns for imparting lateral shuttling movements to said platform moving dollys, means upon said platform moving dollys engageable with the means at the ends of said platforms for moving said platforms laterally from one to the other of the pairs of spaced trackway forming columns, a continuous length of chain operating in a vertical plane at each end of said foundation having spaced platform supporting means by which said platforms will be carried upwardly and/or downwardly along said trackways in spaced and timed relation with the lateral movements of said platform controlling dollys, and means driven by said continuous length of drive chain for driving said reciprocating drive chain and said dollys at a rate of speed that said platforms will be transferred from one to the other of said trackways by said dollys as they reach the upper and/or lower ends of their vertical travel upon said trackways.

8. In an automobile parking device of the character described, the combination of a substantially rectangular foundation base having a vertically extending column at each corner thereof and forming vertical trackways along each side thereof, a plurality of automobile supporting platforms having means engaging one of said columns at each end thereof for guiding same in vertical paths of travel between the columns engaged thereby, a horizontal support extending between the columns at each end of said base, a platform controlling dolly movable laterally along said support between the upper ends of said trackway forming columns, a reciprocating drive chain for imparting the lateral movement to said platform controlling dolly, means upon said platform controlling dolly engaged by the trackway engaging means at the ends of said platforms for moving said platforms from one to the other of said pairs of spaced trackway forming columns, a continuous length of chain operating between the columns at each end of said base, equally spaced platform supporting means carried by said length of chain for moving said platforms upwardly and/or downwardly in spaced relation along the trackways formed by said columns, and means carried by said platforms operating to engage and disengage the spaced platform supporting means carried by said length of chain as said platforms are moved laterally into and out of alignment with the vertical trackways at the sides of said base.

9. In a passenger automobile parking device, the combination of a rectangular base, a vertically extending trackway forming column at each corner of said base, a laterally extending strut between the tops of the vertical columns at the ends of said rectangular base, a platform moving dolly operating shuttle fashion upon said strut between the upper ends of the trackway forming columns at the end of said rectangular base, a reciprocating drive chain for controlling the movements of said platform moving dolly, a plurality of automobile supporting platforms having trackway engaging means at the ends thereof for retaining same in vertical paths of travel between the spaced columns at the sides of said base, means carried by said platform moving dolly engaged by the trackway engaging means at the ends of said platforms for moving said platforms laterally from one to the other of the pairs of spaced columns, a continuous length of chain at each end of said base associated with the trackway forming columns and having platform supporting means by which said platforms will be carried upwardly and/or downwardly in equally spaced relation along the trackways formed by said columns and in timed relation with the lateral movements of said platform moving dolly, and an intermittent driving connection between said continuous length of chain and said reciprocating drive chain for introducing a period of dwell in said latter drive chain as the platform supporting means upon said continuous length of chain reach the end of their travel upon said vertical trackway for engagement with the means carried by the platform moving dolly for lateral movement from one to the other of said vertical trackways.

10. In an automobile parking device of the character described, the combination of a pair of continuous lengths of chain operating in spaced parallel planes and having spaced vertically movable load supporting means there along, a second pair of continuous lengths of chain operating with a periodically reversed direction of movement, and means driven by said first continuous lengths of chain operating in synchronized relation with the movable load supporting means carried by said first pair of continuous lengths of chain for imparting said reversed direction of movement to said second lengths of chain, and a load supporting platform carried by the spaced load supporting means upon said first continuous lengths of chain adapted and arranged to be transferred from control in vertical movement by said first lengths of chain to said second lengths of chain for lateral movement by said second lengths of chain.

11. In an automobile parking device of the character described, the combination of a pair of spaced vertically extending columns forming rails of a trackway between which an automobile supporting platform may be positioned for vertical movement, an automobile supporting platform having rail engaging means at each end, means for moving said platform laterally into alignment with the trackway formed between said spaced columns, a continuous length of chain operating in a vertical direction of travel parallel with and adjacent each of said columns, platform supporting means carried by said chain, and means at the upper and lower limits in the vertical movement of said chain for guiding the platforms supporting means carried by said chain from a vertical direction of travel to a horizontal path of travel, whereby engagement between the support engaging means carried by said platform and the platform supporting means carried by said chain will occur while the platform supporting means carried by said chain is moving in a substantial horizontal plane with respect to its vertically operating direction of travel of said chain.

12. In an automobile parking device of the character described, the combination of a pair of spaced vertically extending columns forming rails of a vertical trackway upon which an automobile supporting platform may be moved vertically, an automobile supporting platform having a rail and chain engaging means at each end, means at the upper and lower ends of said columns for moving said platform laterally into alignment with the trackway formed between said spaced columns, a continuous length of chain operating in a vertical path parallel with and adjacent each of said columns for driving said platform vertically along said trackway, spaced platform engaging means carried by said chain, and means at the upper and lower limits in the vertical paths of said chain for guiding short portions of said chain at these points from their vertical paths of travel to a horizontal path of travel, whereby engagement between the chain engaging means carried by said platform and the platform engaging means carried by said chain will occur while the platform engaging means carried by said chain is moving in a substantially horizontal path with respect to the vertical path of travel of said chain.

13. In an automobile parking device of the character described, the combination of a plurality of vertically extending columns arranged in pairs having opposed rails that form laterally spaced vertically extending open ended trackways therebetween, an automobile supporting platform having guiding rollers at its ends for engagement with the rails of said trackways for vertical movement when in alignment therewith, a traversing platform moving dolly operating with a reciprocating movement between the upper and lower open ends of said trackways, a main drive chain having platform supporting means extending therefrom at spaced points therealong for moving said platform vertically along said trackways, means carried by said traversing dolly for engaging and positioning the guiding rollers carried by said platform into alignment with the rails at the open ends of said trackways, means carried by said platform adapted and arranged to engage the platform supporting means upon said drive chain as said platform is moved into alignment with the rails of said trackway by said traversing dolly and a periodically reversing driving connection driven by said main drive chain for moving said traversing dolly between said trackways in timed relation with the platform supporting means carried by said main drive chain.

14. In an automobile parking device of the character described, the combination of a plurality of vertically extending columns arranged in pairs and having opposed rails that form laterally spaced open ended ascending and descending vertically extending trackways, and automobile supporting platform having guiding rollers at its ends for engagement with the rails of said trackways when in alignment with the open ends thereof, a laterally extending strut between the corresponding ends of the columns forming said laterally spaced trackways, a traversing dolly operating shuttle fashion along said struts at the upper ends of said columns, a drive chain having platform supporting means at spaced points therealong, means carried by said traversing dolly engageable by the rail engaging guide rollers upon said platform for positioning said rollers in alignment with the rails of said open ended trackways, means carried by said platform adapted and arranged to engage the platform supporting means upon said drive chain as said platform is moved into alignment with the rails of said trackways by said traversing dolly, and means for operating said traversing dolly with a reciprocating motion between said trackways in timed relation with said drive chain, whereby said platform may be transferred from one to the other of said trackways as a substantially continuous operation.

15. In an automobile parking device of the character described, the combination of a plurality of vertically extending supports arranged in pairs and having opposed rails that form laterally spaced open ended vertically extending trackways, an automobile supporting platform having guiding rollers for engagement with the rails at the open ends of said trackways when in alignment therewith, a support extending between the ends of corresponding vertically extending trackway forming columns, a traversing platform moving dolly operating shuttle fashion along said support at the upper and lower ends of said columns, a drive chain having platform supporting means at spaced points therealong, means carried by said traversing dolly for positioning the rail engaging rollers carried by said platform in alignment with the rails of said trackways, means carried by said platform adapted and arranged to engage the platform supporting means upon said drive chain as said platform is moved in alignment with the rails at the open ends of said trackway by said traversing dolly, a laterally operating chain for driving said dolly with a reciprocating motion along said support, and a periodically reversing driving connection between said vertically operating drive chain and said laterally operating chain for moving said dolly laterally in timed relation with the vertical movement of said platform along said vertical trackways.

16. In an automobile parking device of the character described, the combination of an elongated automobile supporting platform having lift chain engaging means at its opposite ends, a pair of lift chains operating in spaced parallel planes at each end of said platform and having platform supporting means extending therefrom at equally spaced points throughout their length, said lift chains being disposed over sprockets to provide a vertical ascending lift and a laterally displaced descending lift between which said platform may be stopped to receive an automobile, means at the upper and lower ends of said vertical lifts for moving said platform laterally from one to the other of the descending and ascending lifts formed by said pair of lift chains, and means at the upper and lower limits in the vertical lift paths of said lift chains for guiding said chains outwardly for a short distance from their normal vertical paths of travel and into a substantially horizontal path, whereby the platform supporting means carried by said chains will move toward and away from the chain engaging means at the ends of said platform as said platform is moved laterally from one to the other of said lifts and into alignment with the vertical lift paths of said lift chains.

17. In an automobile parking device of the character described, the combination of an automobile supporting platform having lift chain engaging means at its opposite ends, a pair of lift chains operating in spaced parallel planes at each end of said platform, spaced platform supporting means extending at equally spaced points throughout the length of said chains, said lift chains being disposed over sprockets to follow a rectangular path with an ascending and a laterally displaced descending platform supporting portion between which said platform may be positioned to receive an automobile, a transfer dolly at the upper and lower limits in the travel of the vertical lift chains for moving said platform from one to the other of the descending to the ascending lifts formed between said pair of lift chains, and chain guiding cams at the upper and lower limits in the vertical lift paths of said chains for displacing said chains outwardly in a substantially horizontal path, whereby the platform supporting means carried by said chains will move toward and away from the chain engaging means carried by said platform as the platform is moved respectively into and out of alignment with the lift paths of said lift chains by said transfer dolly.

References Cited in the file of this patent

UNITED STATES PATENTS

| | | |
|---|---|---|
| 1,458,881 | Gromer | June 12, 1923 |
| 2,052,690 | Austin | Sept. 1, 1936 |
| 2,268,862 | Ellis | Jan. 6, 1942 |
| 2,645,367 | Stabile | July 14, 1953 |
| 2,704,609 | Zeckendorf et al. | Mar. 22, 1955 |